(12) United States Patent
Roy et al.

(10) Patent No.: US 11,719,103 B1
(45) Date of Patent: Aug. 8, 2023

(54) COMPONENTS HAVING COMPOSITE LAMINATE WITH CO-CURED CHOPPED FIBERS

(71) Applicant: General Electric Company, Schenectady, NY (US)

(72) Inventors: Abhijit Roy, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/715,360

(22) Filed: Apr. 7, 2022

(51) Int. Cl.
| | |
|---|---|
| *F01D 5/28* | (2006.01) |
| *B32B 5/26* | (2006.01) |
| *B32B 5/02* | (2006.01) |
| *B29C 70/08* | (2006.01) |
| *F01D 5/14* | (2006.01) |
| *B29C 70/34* | (2006.01) |

(52) U.S. Cl.
CPC ............ *F01D 5/282* (2013.01); *B29C 70/081* (2013.01); *B32B 5/02* (2013.01); *B32B 5/26* (2013.01); *F01D 5/147* (2013.01); *B29C 70/342* (2013.01); *B32B 2250/20* (2013.01); *B32B 2250/40* (2013.01); *B32B 2260/023* (2013.01); *B32B 2260/046* (2013.01); *B32B 2262/0261* (2013.01); *B32B 2262/101* (2013.01); *B32B 2262/103* (2013.01); *B32B 2262/105* (2013.01); *B32B 2262/106* (2013.01); *B32B 2262/16* (2021.05); *B32B 2603/00* (2013.01); *F05D 2220/32* (2013.01); *F05D 2230/20* (2013.01); *F05D 2300/6034* (2013.01)

(58) Field of Classification Search
CPC .... F01D 5/282; B32B 2262/16; B29C 70/081
See application file for complete search history.

(56) References Cited

U.S. PATENT DOCUMENTS

| | | | |
|---|---|---|---|
| 3,709,632 | A | 1/1973 | Emmerson et al. |
| 5,439,627 | A | 8/1995 | De Jager |
| 5,951,254 | A | 9/1999 | Sikorski et al. |
| 6,893,211 | B1 | 5/2005 | Eibl et al. |
| 8,807,931 | B2 | 8/2014 | Roberts |
| 10,487,662 | B2 | 11/2019 | Dahl et al. |

(Continued)

FOREIGN PATENT DOCUMENTS

FR         2964426 A1       3/2012

*Primary Examiner* — Long T Tran
(74) *Attorney, Agent, or Firm* — Dority & Manning, P.A.

(57) ABSTRACT

Composite components, such as gas turbine engine airfoils, and methods of forming composite components are provided. For example, a composite component of a gas turbine engine comprises a plurality of continuous fiber layers, each continuous fiber layer formed from a plurality of continuous fibers disposed in a matrix material, and a chopped fiber layer comprising a plurality of chopped fibers formed as a filmed sheet. The chopped fiber layer is laid up with the plurality of continuous fiber layers to form the composite component. A method for forming a composite component comprises laying up a plurality of continuous fiber layers, each continuous fiber layer comprising continuous fibers disposed in a matrix material; laying up a chopped fiber layer with the plurality of continuous fiber layers, the layup of the plurality of continuous fiber layers and the chopped fiber layer forming a reinforced layup; and curing the reinforced layup.

20 Claims, 8 Drawing Sheets

(56) References Cited

U.S. PATENT DOCUMENTS

| | | | |
|---|---|---|---|
| 10,605,087 B2* | 3/2020 | Xu | F01D 5/141 |
| 11,028,696 B2* | 6/2021 | Roberts | F01D 5/147 |
| 2015/0215634 A1* | 7/2015 | Jia | G06T 9/00 |
| | | | 375/240.03 |
| 2016/0245175 A1* | 8/2016 | Clarkson | F02C 7/047 |
| 2016/0369635 A1 | 12/2016 | Xu et al. | |
| 2019/0292931 A1* | 9/2019 | Landwehr | F01D 11/125 |
| 2019/0323363 A1* | 10/2019 | Sippel | F01D 5/288 |
| 2020/0223531 A1 | 7/2020 | Courtier et al. | |
| 2020/0299200 A1* | 9/2020 | Sheedy | C04B 35/565 |
| 2021/0095573 A1* | 4/2021 | Fernandez | F01D 11/08 |
| 2021/0188717 A1* | 6/2021 | Kracum | C04B 35/62868 |

* cited by examiner

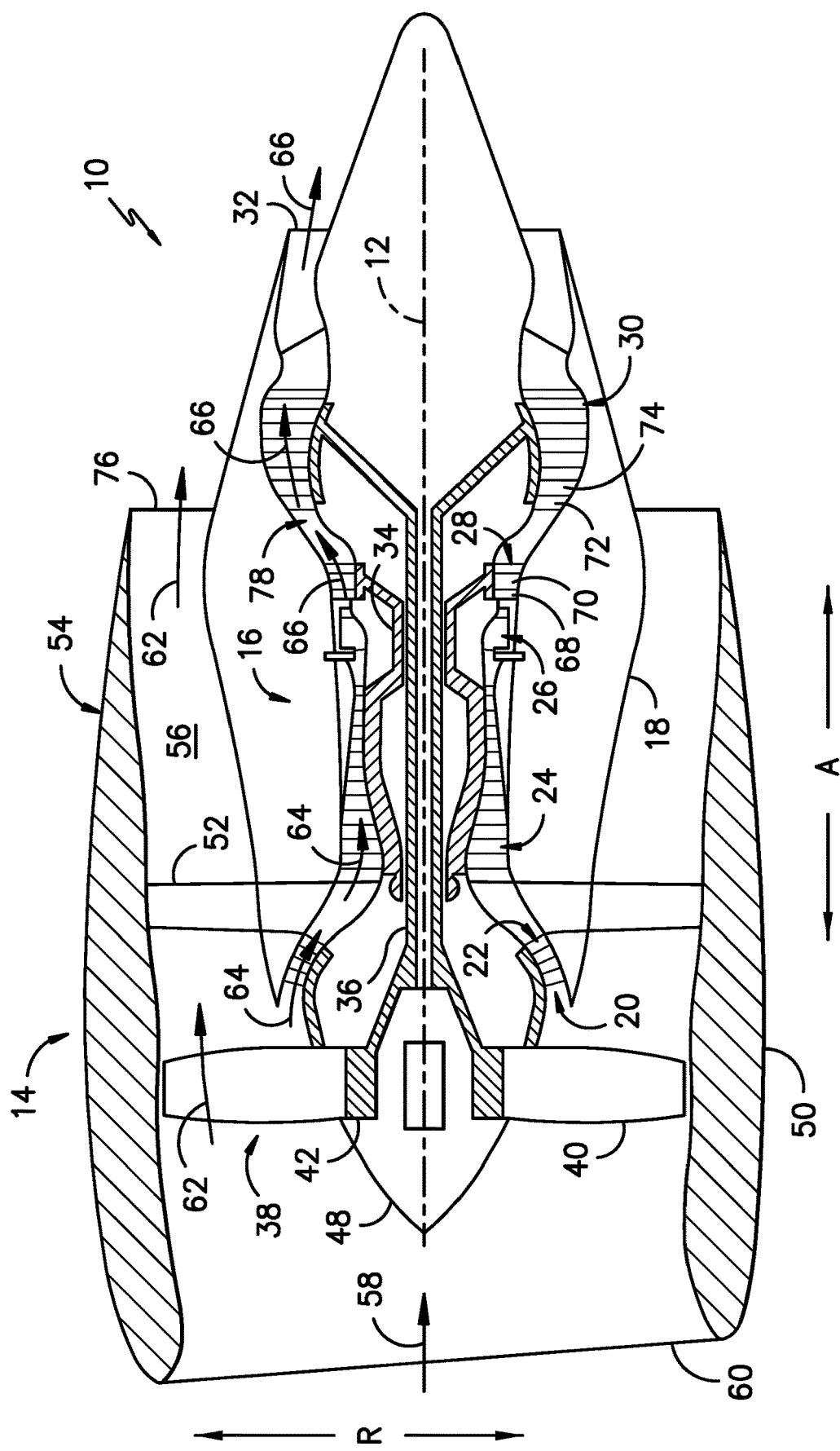
FIG. -1-

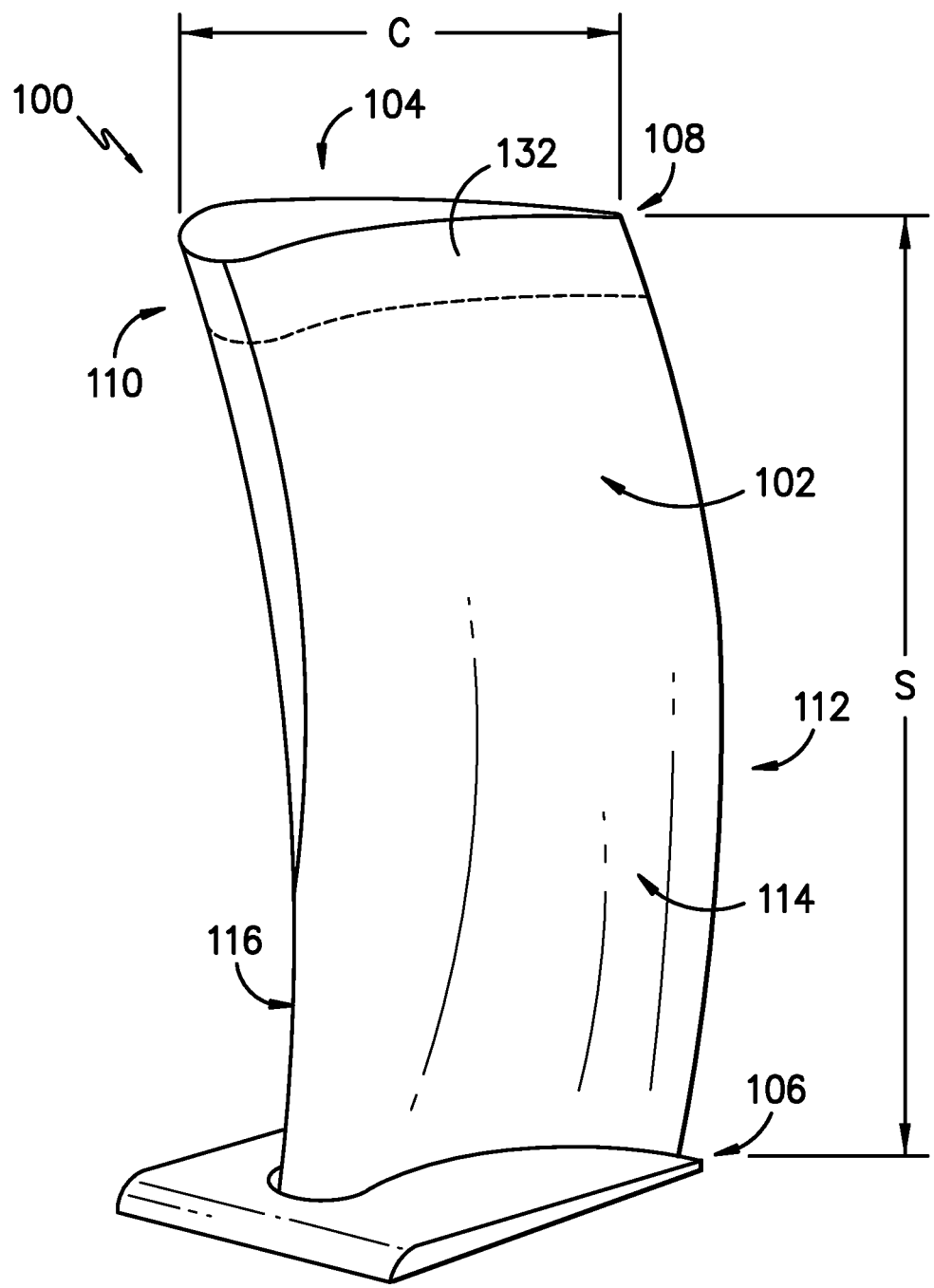
FIG. -2-

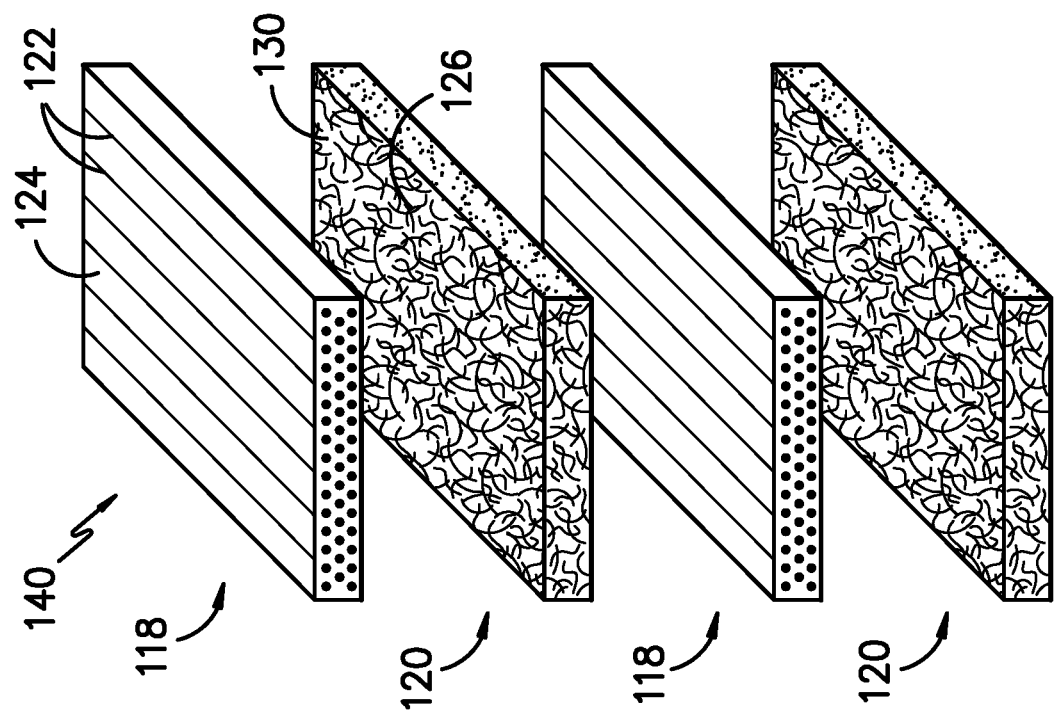
FIG. -3-
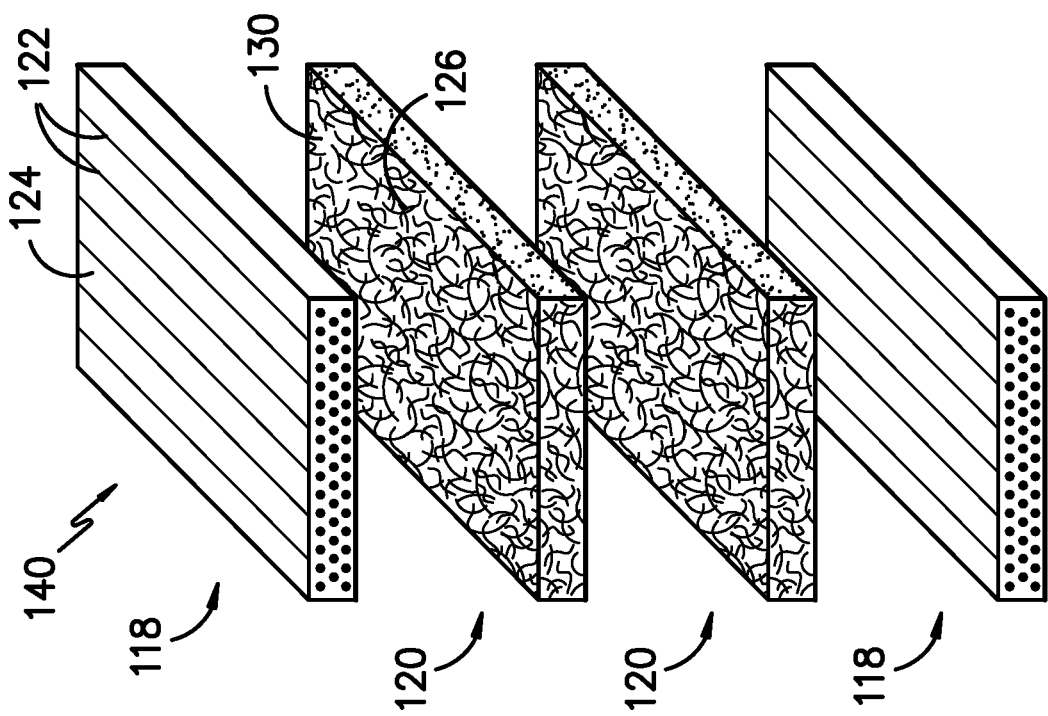
FIG. -4-

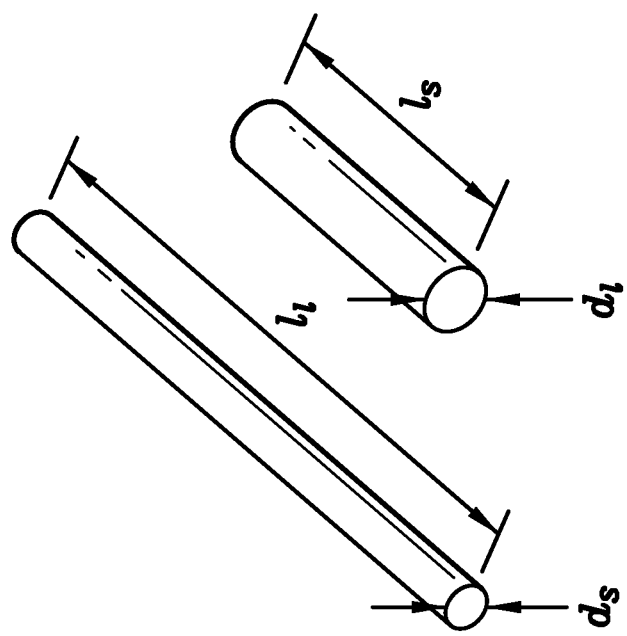
FIG. -5B-
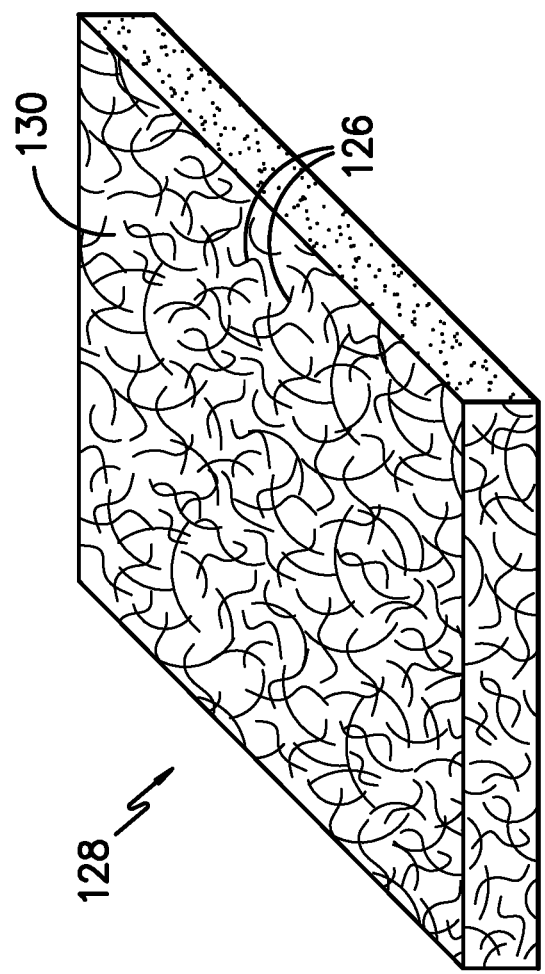
FIG. -5A-

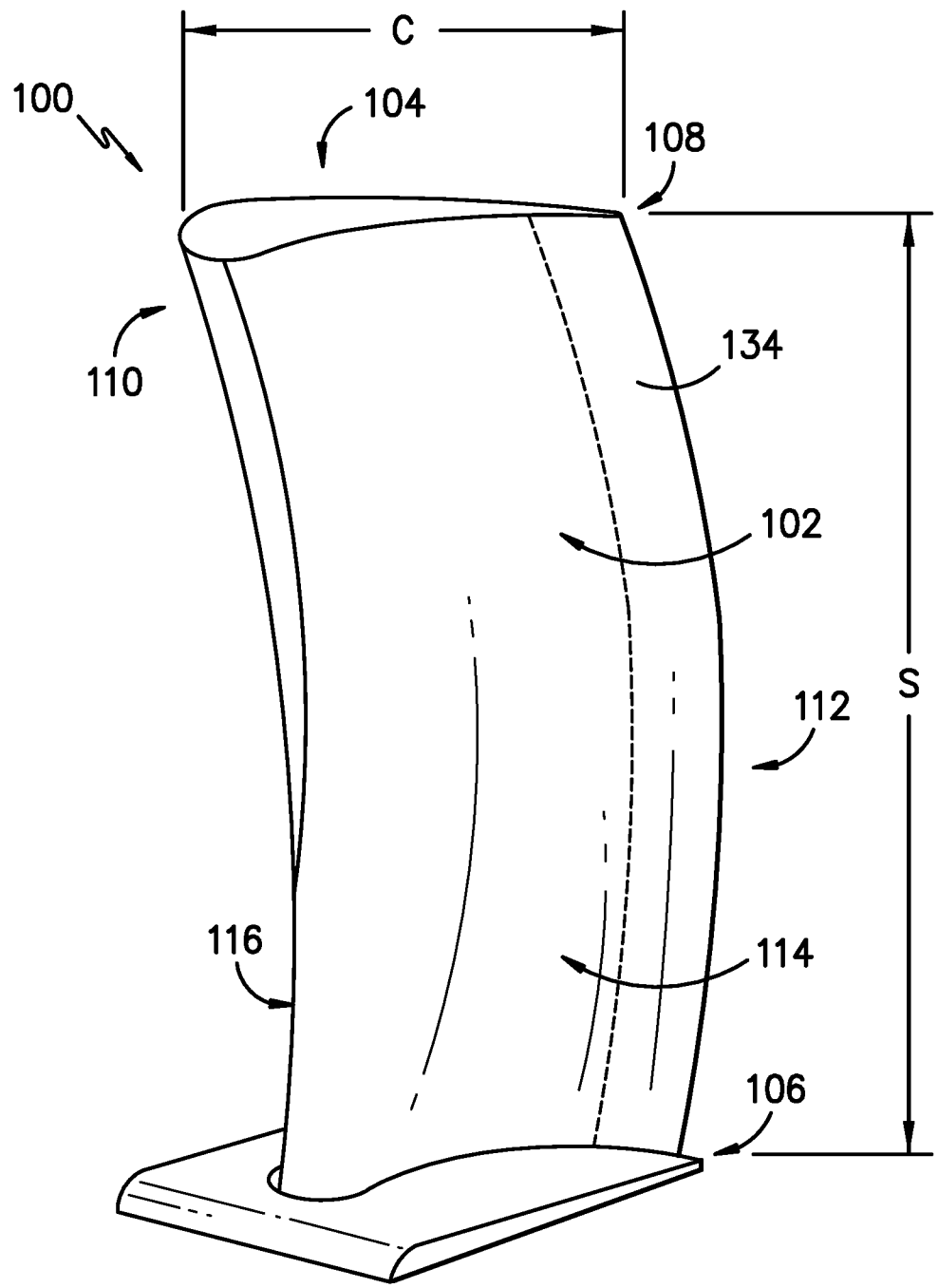
FIG. -6-

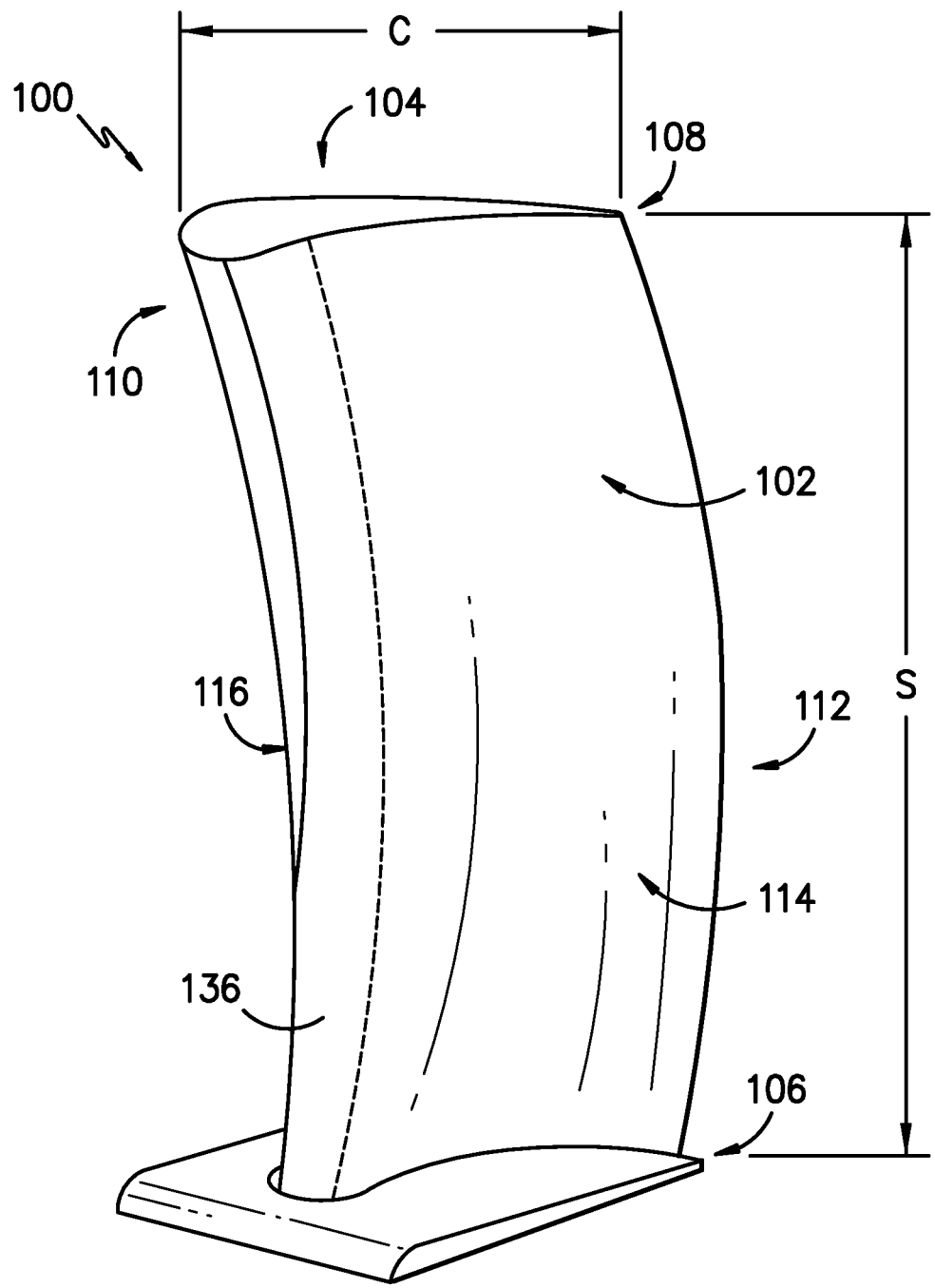
FIG. -7-

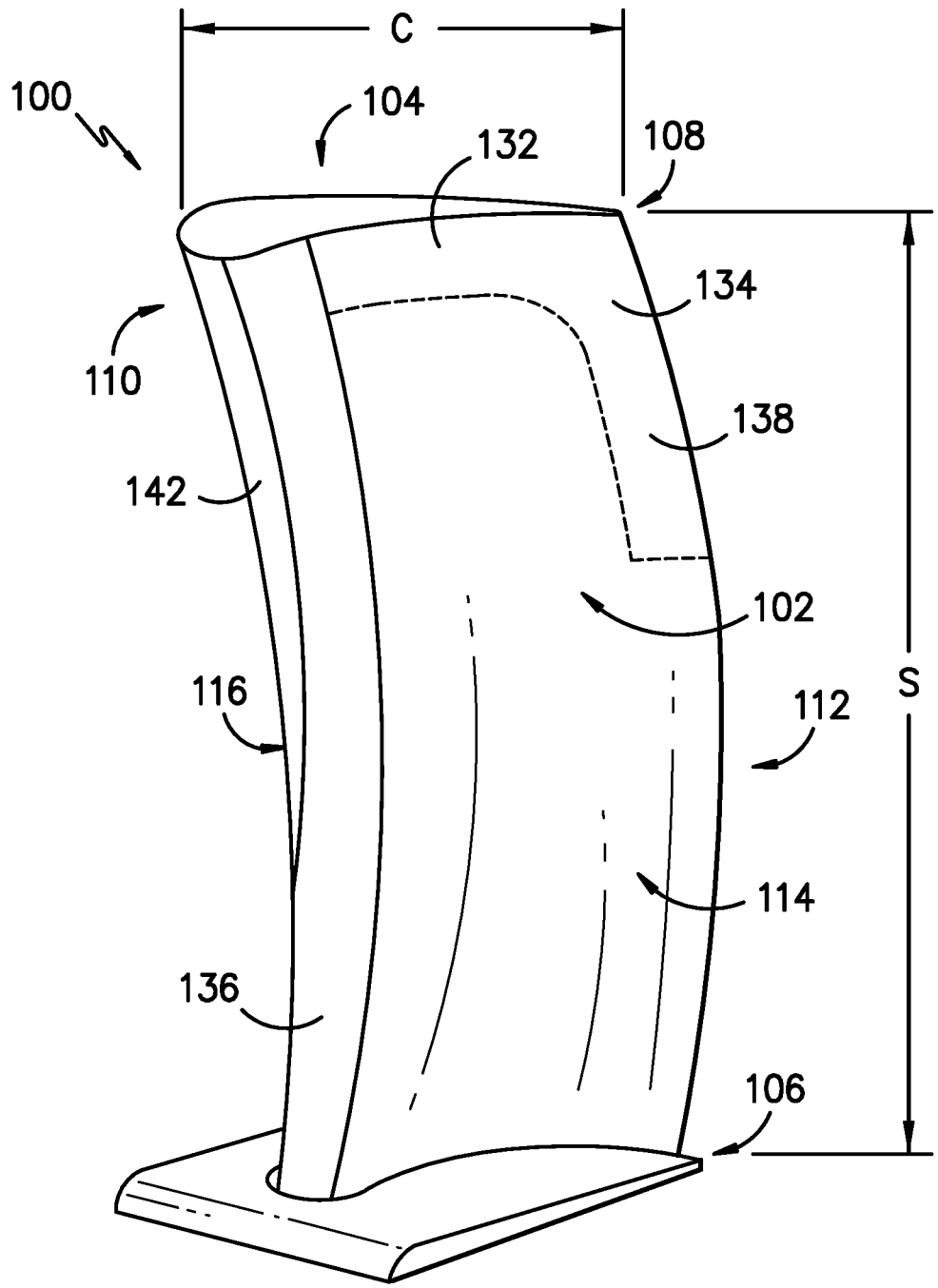
FIG. -8-

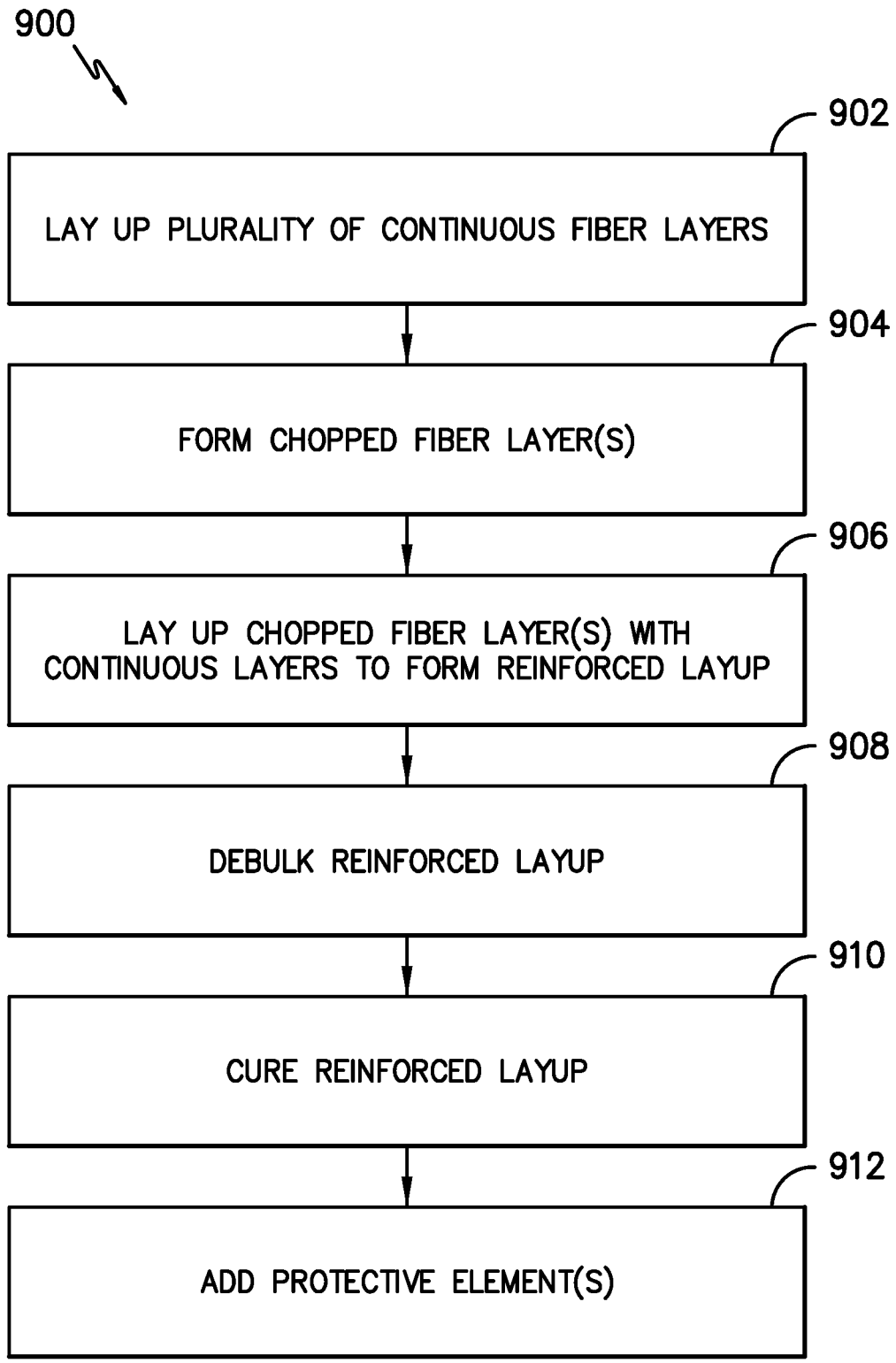
FIG. -9-

COMPONENTS HAVING COMPOSITE LAMINATE WITH CO-CURED CHOPPED FIBERS

FIELD

The present subject matter relates generally to composite components. More particularly, the present subject matter relates to composite components, such as airfoils or other components, formed from a composite laminate including chopped fibers co-cured with the composite material.

BACKGROUND

Aircraft gas turbine engines operate in various conditions and, in certain loading conditions, fan blade tips may rub against the fan casing. The fan casing may be designed to accommodate blade rub, e.g., through a section of abradable material, a trench filler, or the like in the fan casing to mitigate the effects of blade rub from composite fan blades. Further, composite fan blades can comprise metal tip caps, metal leading and/or trailing edge guards, and/or other external metal structural reinforcement to mitigate delamination and fiber breakage, as well as damage from debris impacts and/or blade rub. However, reinforcing the fan casing and/or the fan blades can add weight and complexity to the fan module, which can increase the cost of the fan module and impact engine performance, without avoiding rotor unbalance, e.g., during an FBO event. Accordingly, improved composite airfoils for a gas turbine engine having features for mitigating airfoil tip rub, delamination, fiber breakage, and/or other airfoil damage would be desirable.

BRIEF DESCRIPTION

Aspects and advantages of the invention will be set forth in part in the following description, or may be obvious from the description, or may be learned through practice of the invention.

In one embodiment of the present subject matter, a composite airfoil of a gas turbine engine is provided. The composite airfoil comprises opposite pressure and suction sides extending radially along a span from a root to a tip. The root defines a first radial extremity of the airfoil, and the tip defines a second radial extremity of the airfoil. The composite airfoil further comprises opposite leading and trailing edges extending radially along the span. The pressure and suction sides extend axially between the leading and trailing edges. The composite airfoil also comprises a plurality of continuous fiber layers, each continuous fiber layer comprising a plurality of continuous fibers, and a chopped fiber layer comprising a plurality of chopped fibers formed as a filmed sheet. The chopped fiber layer is laid up with the plurality of continuous fiber layers to form the composite airfoil.

In another embodiment of the present subject matter, a method for forming a composite component of a gas turbine engine is provided. The method comprises laying up a plurality of continuous fiber layers, each continuous fiber layer comprising continuous fibers disposed in a first matrix material; laying up a chopped fiber layer with the plurality of continuous fiber layers, the layup of the plurality of continuous fiber layers and the chopped fiber layer forming a reinforced layup; and curing the reinforced layup.

In a further embodiment of the present subject matter, a composite component of a gas turbine engine is provided. The composite component comprises a plurality of continuous fiber layers, each continuous fiber layer formed from a plurality of continuous fibers disposed in a matrix material, and a chopped fiber layer comprising a plurality of chopped fibers formed as a filmed sheet. The chopped fiber layer is laid up with the plurality of continuous fiber layers to form the composite component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of a gas turbine engine according to various embodiments of the present subject matter.

FIG. 2 provides a side perspective view of a fan blade of the gas turbine engine of FIG. 1, the fan blade having a composite airfoil according to an embodiment of the present subject matter.

FIG. 3 provides a schematic view of a layup of a plurality of continuous fiber layers and a plurality of chopped fiber layers according to an embodiment of the present subject matter.

FIG. 4 provides a schematic view of a layup of a plurality of continuous fiber layers and a plurality of chopped fiber layers according to another embodiment of the present subject matter.

FIG. 5A provides a schematic view of a filmed sheet comprising a plurality of chopped fibers in a matrix material according to an embodiment of the present subject matter.

FIG. 5B provides a schematic view of two chopped fibers having different lengths and diameters according to an embodiment of the present subject matter.

FIGS. 6 through 8 each provide a side perspective view of a fan blade of the gas turbine engine of FIG. 1, the fan blade having a composite airfoil according to various embodiments of the present subject matter.

FIG. 9 provides a flow diagram illustrating a method for forming a composite airfoil, according to an embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides composite components comprising a plurality of continuous fiber layers and at least one chopped fiber layer that reinforces or strengthens the composite components to protect against delamination, fiber breakage, or damage from rubs or debris impacts. As described herein, each continuous fiber layer comprises a plurality of continuous fibers disposed in a matrix material, and each chopped fiber layer comprises a plurality of chopped fibers formed as a filmed sheet. For instance, the filmed sheet may be formed by infusing the plurality of chopped fibers with a matrix material, which may the same or a different matrix material in which the continuous fibers of the continuous fiber layers are disposed. The chopped fiber layers or layers are laid up with the plurality of continuous fiber layers to form the composite component. In some embodiments, the chopped fibers may be metallic, but other non-metallic materials also may be used for the chopped fibers. Further, the composite component may be a gas turbine engine component, such as an airfoil and, more particularly, a fan blade, but the composite component may be for any other suitable application.

Referring now to the drawings, wherein identical numerals indicate the same elements throughout the figures, FIG. 1 is a schematic cross-sectional view of a gas turbine engine in accordance with an embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the embodiment of FIG. 1, disk 42 is covered by rotatable front nacelle 48 aerodynamically contoured to promote an airflow through the plurality of fan blades 40. Additionally, the fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a polymer matrix composite (PMC) material or a ceramic matrix composite (CMC) material, which has high temperature capability. Composite materials generally comprise a fibrous reinforcement material embedded in matrix material, e.g., a polymer or ceramic matrix material. The reinforcement material serves as a load-bearing constituent of the composite material, while the matrix of a composite material serves to bind the fibers together and act as the medium by which an externally applied stress is transmitted and distributed to the fibers. As used herein, the term "composite" is understood to include, but is not limited to, a PMC, a CMC, and a hybrid composite, e.g., a PMC or CMC in combination with one or more metallic materials or a PMC or CMC in combination with more than one PMC or CMC.

PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins. Thus, generally, PMC materials include matrices that are thermoset or thermoplastic and reinforcements that include, but are not limited to, glass, graphite, aramid, or organic fiber of any length, size, or orientation or combination of these reinforcements, and are further understood to include, but are not limited to, being manufactured by injection molding, resin transfer molding, prepreg tape layup (hand or automated), pultrusion, or any other suitable method for manufacture of a reinforced polymer matrix composite structure or combination of these manufacturing methods.

Exemplary CMC materials may include silicon carbide (SiC), silicon, silica, carbon, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform (e.g., prepreg plies) or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Turning to FIG. 2, a composite component of a gas turbine engine, such as engine 10, will be described according to an embodiment of the present subject matter. As illustrated in the embodiment of FIG. 2, the composite component 100 may be a composite airfoil such as a fan blade 40, which may be referred to herein as "airfoil 100." In other embodiments, the composite component 100 may be another composite airfoil, such as an inlet guide vane (IGV) or an outlet guide vane (OGV) 52, or other composite component such as a fan case, a shroud, etc.

The airfoil 100 shown in FIG. 2 includes a concave pressure side 102 opposite a convex suction side 104. Opposite pressure and suction sides 102, 104 of the airfoil 100 extend radially along a span S from a root 106 to a tip 108 at the radially outermost portion of the fan blade 40. That is, the root 106 defines a first radial extremity of the airfoil 100, and the tip 108 defines a second radial extremity of the airfoil 100. The pressure and suction sides 102, 104 of the airfoil 100 extend axially along a chord length c between a leading edge 110 and an opposite trailing edge 112. The leading edge 110 defines a forward end of the airfoil 100, and the trailing edge 112 defines an aft end of the airfoil 100. Further, the pressure side 102 defines an outer pressure surface 114 of the airfoil 100, and the suction side 104 defines an outer suction surface 116 of the airfoil 100.

Referring to FIGS. 3 and 4, the composite component 100 (e.g., the airfoil 100 shown in FIG. 2) comprises a composite material, such as a CMC material or a PMC material, reinforced with chopped fibers, such as chopped metal fibers. In at least some embodiments, the composite component 100 is formed from a plurality of continuous fiber layers 118 and at least one chopped fiber layer 120 that are co-cured to produce the composite component 100. Each continuous fiber layer 118 comprises a plurality of continuous fibers 122 disposed in a first matrix material 124. In some embodiments, the continuous fibers 122 are one of the fiber materials described with respect to PMC materials, such as carbon, glass, and/or polymer (e.g., Kevlar®) fibers, and the first matrix material 124 is a resin such as described above with respect to PMC materials. In other embodiments, the continuous fibers 122 are ceramic fibers as described with respect to CMC materials, and the first matrix material 124 is, e.g., a silicon carbide (SiC), silicon, silica, carbon, or alumina matrix material as described above with respect to CMC materials.

Each chopped fiber layer 120 comprises a plurality of chopped fibers 126 formed as a filmed sheet 128 (FIG. 5A). For example, as shown in FIG. 5A, the filmed sheet 128 is formed from a plurality of randomly oriented chopped fibers 126 infused with a second matrix material 130. The filmed sheet 128 may form a single chopped fiber layer 120, or the filmed sheet 128 may be cut to form two or more chopped fiber layers 120.

The filmed sheet 128 may be formed in a manner similar to a prepreg ply. For instance, in some embodiments, the second matrix material 130 is flowed around the chopped fibers 126 and allowed to dry. Once the second matrix material 130 is dry, the filmed sheet 128 may be cut into two or more chopped fiber layers 120 or may be laid up as a single chopped fiber layer 120 with continuous fiber layers 118.

The chopped fibers 126 can be made from various materials, and the filmed sheet(s) 128 can comprise chopped fibers 126 formed from one material or a combination of two or more materials. In some embodiments, the chopped fibers 126 are metallic chopped fibers. For example, the metallic chopped fibers 126 are at least one of titanium, aluminum, and nickel fibers. In other embodiments, the chopped fibers 126 are non-metallic fibers, such as ceramic fibers or ceramic alloy fibers. For instance, the ceramic or ceramic alloy fibers can comprise silicon, and in some embodiments may be formed from sapphire, silicon carbide, alumina silicates, and/or carbon or combinations thereof. The second matrix material 130 may be one of the various matrix materials described herein and may be the same matrix material or a different matrix material from the first matrix material 124 of the continuous fiber layers 118.

The chopped fibers 126 of the chopped fiber layers 120 are not continuous from one end of a chopped fiber layer 120 to an opposite end of the chopped fiber layer 120. Instead, the chopped fibers 126 generally are relatively short lengths of fiber that are randomly oriented within a filmed sheet 128. The plurality of chopped fibers 126 within a filmed sheet 128 need not have the same length, e.g., chopped fibers 126 of a variety of lengths may be used to form a filmed sheet 128. Thus, unlike the continuous fibers 122 of the continuous fiber layers 118, the chopped fibers 126 do not extend end-to-end along a chopped fiber layer 120 but randomly extend in a variety or plurality of directions with respect to a respective layer 120.

As shown in FIGS. 3 and 4, for at least some composite components 100, such as the airfoil 100 depicted in FIG. 2, a plurality of chopped fiber layers 120 are laid up with the plurality of continuous fiber layers 118 such that the plurality of chopped fiber layers 120 are dispersed within the plurality of continuous fiber layers 118. In some embodiments, as illustrated in FIG. 3, the chopped fiber layers 120 may be alternated with the continuous fiber layers 118 such that a continuous fiber layer 118 is disposed between each chopped fiber layer 120. In other embodiments, as illustrated in FIG. 4, more than one chopped fiber layer 120 may be laid up between continuous fiber layers 118. For example, two chopped fiber layers 120 may be disposed between continuous fiber layers 118 as depicted in FIG. 4, but in other embodiments, three, four, or more chopped fiber layers 120 may be disposed between a first continuous fiber layer 118 and a second continuous fiber layer 118.

It will be appreciated that the schematic depiction in FIGS. 3 and 4 illustrate only a portion of a ply layup for a composite component such as the airfoil 100. Additional continuous fiber layers 118 and chopped fiber layers 120 may be used to form a composite component 100, with FIGS. 3 and 4 illustrating some embodiments of the relative positions of the layers 118 and layers 120 (i.e., alternating layers 118, 120 in FIG. 3 and multiple layers 120 between layers 118 in FIG. 4) in a layup. In other embodiments, a chopped fiber layer 120 may be disposed at an inner surface and/or an outer surface of the composite component such that the chopped fiber layer 120 is not between two or more continuous fiber layers 118 but, rather, is an exterior or surface layer. In still other embodiments, only one chopped fiber layer 120 may be laid up with a plurality of continuous fiber layers 118 to form the composite component. Other ways of positioning the continuous fiber layers 118 and chopped fiber layers 120 relative to one another may be used as well.

In at least certain embodiments, a fiber density varies among a plurality of chopped fiber layers 120 of the composite component 100 and/or within a single chopped fiber layer 120. The fiber density may be understood as the concentration of the chopped fibers 126 within a chopped fiber layer 120 or a section of a chopped fiber layer 120, or the relative proportion of chopped fibers 126 and the second matrix material 130 within a chopped fiber layer 120. For example, a chopped fiber layer 120 with a higher fiber density has a higher ratio of chopped fibers 126 to second matrix material 130 than a chopped fiber layer 120 with a lower fiber density.

In some embodiments, the fiber diameter varies among the chopped fibers 126 of the plurality of chopped fiber layers 120 or within a single chopped fiber layer 120 to vary the fiber density. That is, as shown in FIG. 5B, some of the chopped fibers 126 have a larger diameter $d_l$ than other of the chopped fibers 126, which have a smaller diameter $d_s$. A chopped fiber layer 120 with a higher fiber density may have more chopped fibers 126 of the larger diameter $d_l$ than the smaller diameter $d_s$; a chopped fiber layer 120 with a lower fiber density may have more chopped fibers 126 of the smaller diameter $d_s$ than the larger diameter $d_l$. Comparatively, a first chopped fiber layer 120 with a higher fiber density may have more chopped fibers 120 of the larger diameter $d_l$ than a second chopped fiber layer 120.

In other embodiments, a fiber length varies among the chopped fibers 126 of the plurality of chopped fiber layers 120 or within a single chopped fiber layer 120 to vary the fiber density. That is, as shown in FIG. 5B, some of the chopped fibers 126 have a longer length $l_l$ than other of the chopped fibers 126, which have a shorter length $l_s$. A chopped fiber layer 120 with a higher fiber density may have more chopped fibers 126 of the longer length $l_l$ than the shorter length $l_s$; a chopped fiber layer 120 with a lower fiber density may have more chopped fibers 126 of the shorter length $l_s$ than the longer length $l_l$. Comparatively, a first chopped fiber layer 120 with a higher fiber density may have more chopped fibers 120 of the longer length $l_l$ than a second chopped fiber layer 120.

In still other embodiments, an areal weight varies among the chopped fibers 126 of the plurality of chopped fiber layers 120 or within a single chopped fiber layer 120 to vary the fiber density. For example, one or more of the chopped fiber layers 120 may have a higher concentration of chopped fibers 126, such that the weight of the chopped fibers 126 over a given area is higher than for other of the chopped fiber layers 120 that have a lower concentration of chopped fibers over the same area. As another example, one or more of the chopped fiber layers 120 may be formed from a combination of two or more types of chopped fibers 126, e.g., chopped fibers 126 made from a first material (which may be referred to as "first chopped fibers 126") and chopped fibers 126 made from a second material (which may be referred to as "second chopped fibers 126"). The first material may have a greater weight than the second material, such that a chopped fiber layer 120 containing a greater percentage of the first chopped fibers 126 made from the first material has a greater areal weight than a chopped fiber layer 120 containing a greater percentage of the second chopped fibers 126 made from the second material. Stated differently, a first chopped fiber layer 120 having a greater ratio of first chopped fibers to second chopped fibers than a second chopped fiber layer 120 has a greater areal weight and, therefore, a greater fiber density than the second chopped fiber layer 120.

It will be appreciated that chopped fiber layers 120 having a greater fiber density may be used, e.g., to provide greater reinforcement in areas more prone to damage or having a higher probability of delamination. As one example, a plurality of chopped fibers layers 120 disposed among a plurality of continuous fiber layers 118 within a tip section 132 of the depicted airfoil 100 may increase in fiber density along the span S. That is, the lower fiber density chopped fiber layers 120 may be disposed closer to the root 106 than the higher fiber density chopped fiber layers 120, which are disposed closer to the tip 108. As another example, chopped fiber layers 120 having a higher fiber density may be disposed closer to the outer surface of the composite component 100 (e.g., the outer pressure surface 114 and/or outer pressure surface 116 of the airfoil 100) than chopped fiber layers 120 having a lower fiber density. It will be understood that the chopped fibers 126 are reinforcing fibers, such that a higher density of the chopped fibers 126 (e.g., compared to the second matrix material 130) can provide greater reinforcement capability.

The location of the one or more chopped fiber layers 120 within the composite component 100 may be biased to one or more sections of the component to provide reinforcement in specific areas, which may be identified through analysis, testing, or the like. For example, referring back to FIG. 2, in some embodiments of the airfoil 100, the chopped fiber layer or layers 120 are disposed adjacent the tip 108 to reinforce the tip 108 of the airfoil 100. For example, a plurality of chopped fiber layers 120 may be dispersed among the continuous fiber layers 118 in a tip section 132, with the remainder of the airfoil 100 formed from only continuous fiber layers 118. For instance, as shown in FIG. 2, the airfoil 100 includes a tip section 132 that extends axially along at least a portion of the chord length c and radially along a portion of the span S adjacent the tip 108. Exemplary axial locations for the tip section 132, as measured axially from the leading edge 110 to the trailing edge 112 (i.e., the leading edge 110 is at 0% of the chord length c and the trailing edge 112 is at 100% of the chord length c), may include, but are not limited to, from about 0% of the chord length c to about 30% of the chord length c (e.g., adjacent the leading edge 110); from about 70% of the chord length c to about 100% of the chord length c (e.g., adjacent the trailing edge 112); and from 0% of the chord length c to 100% of the chord length c (i.e., along the entire chord length c). Exemplary radial locations for the tip section 132, as measured radially from the root 106 (i.e., the root 106 is at 0% of the span S and the tip 108 is at 100% of the span S), may include, but are not limited to, from about 50% of the span S to 100% of the span S (i.e., from about mid-span to the tip 108); from about 60% of the span S to 100% of the span S; from about 75% of the span S to 100% of the span S; from about 80% of the span S to 100% of the span S; from about 85% of the span S to 100% of the span S; from about 90% of the span S to 100% of the span S; and from about 95% of the span S to 100% of the span S.

Referring to FIG. 6, in other embodiments, the chopped fiber layer or layers 120 are disposed adjacent the trailing edge 112 to reinforce the trailing edge 112 of the airfoil 100. For instance, a plurality of chopped fiber layers 120 may be dispersed among the continuous fiber layers 118 in a trailing edge section 134 (e.g., as shown in FIGS. 3 and 4 or any other suitable dispersion), with the remainder of the airfoil 100 formed from only continuous fiber layers 118. For example, as shown in FIG. 6, the airfoil 100 includes a trailing edge section 134 that extends axially along a portion of the chord length c and radially along at least a portion of the span S adjacent the trailing edge 112. Exemplary axial locations for the trailing edge section 134, as measured axially from the leading edge 110 to the trailing edge 112 (i.e., the leading edge 110 is at 0% of the chord length c and the trailing edge 112 is at 100% of the chord length c), may include, but are not limited to, from about 60% of the chord length c to about 100% of the chord length c; from about 70% of the chord length c to about 100% of the chord length c; from about 75% of the chord length c to about 100% of the chord length c; from about 80% of the chord length c to about 100% of the chord length c; from about 85% of the chord length c to about 100% of the chord length c; from about 90% of the chord length c to about 100% of the chord length c; and from about 95% of the chord length c to about 100% of the chord length c. Exemplary radial locations for the trailing edge section 134, as measured radially from the root 106 (i.e., the root 106 is at 0% of the span S and the tip 108 is at 100% of the span S), may include, but are not limited to, from about 0% of the span S to 100% of the span S (i.e., from the root 106 to the tip 108); from about 50% of the span S to 100% of the span S (i.e., from about mid-span to the tip 108); and from about 75% of the span S to 100% of the span S.

Turning to FIG. 7, in still other embodiments, the chopped fiber layer or layers 120 are disposed adjacent the leading edge 110 to reinforce the leading edge 110 of the airfoil 100. For instance, a plurality of chopped fiber layers 120 may be dispersed among the continuous fiber layers 118 in a leading edge section 136 (e.g., as shown in FIGS. 3 and 4 or any other suitable dispersion), with the remainder of the airfoil 100 formed from only continuous fiber layers 118. Similar to the tip section 132 and the trailing edge section 134, the airfoil 100 of FIG. 7 includes a leading edge section 136 that extends axially along a portion of the chord length c and radially along at least a portion of the span S adjacent the leading edge 110. Exemplary axial locations for the leading edge section 136, as measured axially from the leading edge 110 to the trailing edge 112 (i.e., the leading edge 110 is at 0% of the chord length c and the trailing edge 112 is at 100% of the chord length c), may include, but are not limited to, from about 0% of the chord length c to about 40% of the chord length c; from about 0% of the chord length c to about 30% of the chord length c; from about 0% of the chord length c to about 25% of the chord length c; from about 0% of the chord length c to about 20% of the chord length c; from about 0% of the chord length c to about 15% of the chord length c; from about 0% of the chord length c to about 10% of the chord length c; and from about 0% of the chord length c to about 5% of the chord length c. Exemplary radial locations for the leading edge section 136, as measured radially from the root 106 (i.e., the root 106 is at 0% of the span S and the tip 108 is at 100% of the span S), may include, but are not limited to, from about 0% of the span S to 100% of the span S (i.e., from the root 106 to the tip 108); from about 50% of the span S to 100% of the span S (i.e., from about mid-span to the tip 108); and from about 75% of the span S to 100% of the span S.

Referring now to FIG. 8, in further embodiments, a plurality of chopped fiber layers 120 are disposed among the plurality of continuous fiber layers 118 adjacent various portions of the airfoil 100 to reinforce various sections and/or features of the airfoil 100. For example, as illustrated in FIG. 8, the airfoil 100 includes a tip section 132 and a trailing edge section 134 as described with respect to FIGS. 2 and 6. Thus, for the depicted embodiment, the plurality of chopped fiber layers 120 are disposed within a region 138 that extends axially along at least a portion of the chord length c near the tip 108 and radially along at least a portion of the span S near the trailing edge 112. The axial and radial length of the region 138 may be within the ranges for the axial locations for the tip section 132 and the radial locations for the trailing edge section 134 described above with respect to FIGS. 2 and 6.

As further shown in FIG. 8, the depicted airfoil 100 includes a leading edge section 136. In some embodiments, the leading edge section 136 of FIG. 8 may include one or more chopped fiber layers 120 disposed among a plurality of continuous fiber layers 118, e.g., as described with respect to FIG. 7. In other embodiments, the leading edge section 136 of FIG. 8 may comprise a protective element, such as a metal cap 142, disposed over the leading edge 110 instead of the leading edge section 136 being reinforced with chopped fiber layers 120. It will be appreciated that, in some embodiments, metal caps 142 may be used in conjunction with the chopped fiber layer or layers 120 embedded in the composite component 100 (e.g., the depicted airfoil 100) to further reinforce one or more segments of the composite component 100 (e.g., the leading edge 110 and/or the trailing edge 112 of the airfoil 100).

Further, the dispersion of the chopped fiber layers 120 may be varied through a thickness of the composite component 100. In some embodiments, a plurality of chopped fiber layers 120 are biased toward an outer surface of the airfoil 100, e.g., the outer pressure surface 114 and/or the outer suction surface 116, such that at least a majority of the plurality of chopped fiber layers 120 are disposed among the plurality of continuous fiber layers 118 proximate the outer surface. Stated differently, the chopped fiber content of the composite component 100 may be graded such that it tapers from an outer surface of the component 100 inward. For instance, in the tip section 132 described with respect to FIG. 2, the plurality of chopped fiber layers 120 may be biased toward the outer pressure surface 114 and the outer suction surface 116 in the tip section 132 such that the chopped fiber layers 120 in the tip section 132 are primarily disposed toward the outer surfaces 114, 116 of the airfoil 100. As another example, a plurality of chopped fiber layers 120 may be disposed among the plurality of continuous fiber layers 118 throughout the airfoil 100 (i.e., not just in one or more of the tip section 132, trailing edge section 134, and leading edge section 136) but the chopped fiber layers 120 may be biased toward one or both of the outer pressure surface 114 and the outer suction surface 116 such that the chopped fiber layers 120 are concentrated at or near the outer surface(s) of the airfoil 100. It will be appreciated that concentrating the chopped fiber layers 120 at or near the outer surface of the composite component 100 (e.g., the depicted airfoil 100) can provide targeted reinforcement. For example, the component typically may experience damaging forces along its outer surface rather than in the interior of the component such that the chopped fiber layers 120 at or near the outer surface help prevent or reduce damage in the most damage-prone areas without requiring the chopped fiber layers 120 to be dispersed throughout the component.

Of course, it will be understood that the chopped fiber layers 120 may be dispersed among the continuous fiber layers 118 in more targeted ways as well. For instance, rather than biasing a plurality of chopped fiber layers 120 toward an entire outer surface of the composite component 100, a chopped fiber layer 120 or a plurality of chopped fiber layers 120 may be disposed at or near one or more portions or segments of the outer surface rather than the entire outer surface. As a few nonlimiting examples, a plurality of chopped fiber layers 120 may be biased toward the outer pressure surface 114 of the airfoil 100 rather than both the outer pressure surface 114 and the outer suction surface 116; a plurality of chopped fiber layers 120 may be biased toward the outer suction surface 116 of the airfoil 100 rather than both the outer pressure surface 114 and the outer suction surface 116; a plurality of chopped fiber layers 120 may be biased toward one or both of the outer pressure surface 114 and the outer suction surface 116 of the airfoil 100 from a mid-span radial location to the tip 108 (e.g., from about 50% of the span S to about 100% of the span S); or a plurality of chopped fibers layers 120 may be biased toward the outer suction surface 116 within a mid-span region of the airfoil, e.g., from about 40% of the span S to about 60% of the span S.

Referring now to FIG. 9, a flow diagram is provided illustrating a method 900 of forming a composite component of a gas turbine engine. As shown in FIG. 9, the method 900 includes laying up (902) a plurality of continuous fiber layers 118. As described herein, each continuous fiber layer 118 comprises continuous fibers 122 disposed in a first matrix material 124. In various embodiments, the fibers 122 and first matrix material 124 may be any of the various fiber and matrix materials described herein for polymer matrix composite (PMC) materials or ceramic matrix composite (CMC) materials.

The method 900 further includes forming (904) one or more chopped fiber layers 120. In some embodiments, each chopped fiber layer 120 comprises a plurality of metallic chopped fibers 126 infused with a second matrix material 130 to form a filmed sheet 128. In other embodiments, each chopped fiber layer 120 comprises a plurality of non-metallic chopped fibers 126, such as ceramic chopped fibers, which are infused with a second matrix material 130 to form a filmed sheet 128. As described herein, one or more chopped fiber layers 120 may be formed from the filmed sheet 128, e.g., each filmed sheet 128 may form a single chopped fiber layer 120 or the filmed sheet 128 may be cut to form two or more chopped fiber layers 120.

As illustrated in FIG. 9, the method 900 also includes laying up (906) the chopped fiber layer or layers 120 with the plurality of continuous fiber layers 118. The layup of the plurality of continuous fiber layers 118 and the chopped fiber layer or layers 120 forms a reinforced layup 140 (FIGS. 3, 4). That is, the layup of continuous fiber layers 118 is reinforced with the chopped fiber layer or layers 120, such that the layup of layers 118 and layer(s) 120 may be referred to as a reinforced layup 140.

Referring still to FIG. 9, the method 900 also includes thermally and/or chemically processing the reinforced layup 140 to form the composite component 100. For example, the method 900 can include debulking (908) and curing (910) the reinforced layup 140, e.g., at an elevated temperature and an elevated pressure in an autoclave, to adhere or laminate the plurality of layers together, including laminating the continuous fiber layers 118 to the chopped fiber layer or layers 120. As such, the continuous fiber layers 118 and chopped fiber layers 120 are co-cured to form the composite component 100. As described herein, the first matrix material 124 of the continuous fiber layers 118 and the second matrix material 130 of the chopped fiber layer(s) 120 may be the same matrix material or a different matrix material. Co-curing the continuous fiber layers 118 with the one or more chopped fiber layers 120 can promote co-mingling and/or sharing of the first and second matrix materials 124, 130 between the layers 118, 120. Further, it will be appreciated that an elevated temperature is above ambient temperature, and an elevated pressure is above ambient pressure.

In some embodiments, the composite component 100 may undergo further processing, e.g., densification and finishing processes, following the autoclave process. As described herein, for a CMC component 100, such as a CMC airfoil 100, the composite airfoil layup may be debulked and, if appropriate, cured while subjected to elevated pressures and temperatures to produce a cured preform, e.g., the layup or preform may be cured in an autoclave to form an autoclaved body. In certain embodiments, the autoclaved body is then heated (fired) in a vacuum or inert atmosphere to decompose the binders, remove the solvents, and convert the precursor to the desired ceramic matrix material. Due to decomposition of the binders, the result for the preform is a porous CMC fired body that may undergo densification, e.g., melt infiltration (MI), to fill the porosity and yield the respective CMC component. Specific processing techniques and parameters for the thermal and/or chemical processing of the airfoil layup will depend on the particular composition of the materials. As an example, other known methods or techniques for curing composite plies, as well as for densifying a CMC component, may be utilized.

Further, the method 900 may comprise applying or attaching (912) one or more protective elements, such as a metal cap 142 applied over leading edge section 136 as described with respect to FIG. 8, to the composite component 100. As described herein, the protective element(s) may be applied over a section of the composite component 100 without chopped fiber layers 120, or the protective element(s) may be used in conjunction with the chopped fiber layer or layers 120, e.g., a metal cap 142 may be applied over a section of the composite component 100 that comprises one or more chopped fiber layers 120.

Accordingly, as described herein, the present subject matter provides composite components, such as composite airfoils including gas turbine engine fan blades, with at least one chopped fiber layer and methods of forming composite components with at least one chopped fiber layer. For instance, the present subject matter provides composite components comprising one or more chopped fiber layers, which each comprise a plurality of chopped fibers formed as a filmed sheet, that are laid up and co-cured with continuous fiber layers, which each comprise a plurality of continuous fibers. The chopped fiber layers can help reinforce the composite component and, in at least some embodiments, can provide targeted reinforcement by being laid up with the continuous fiber layers in certain, targeted areas rather than throughout the component. Benefits of the present subject matter include the reduction or eliminate of separate metal tip caps, leading edge guards, and/or trailing edge guards; the reduction or elimination of disbonding or unbonding between a metal cap or guard and a composite component; elimination of tip cap field replacements; reduction or elimination of separate bond operations during manufacture (i.e., to bond a metal cap or guard to a composite component); optimization of material usage to targeted areas (e.g., optimizing chopped fiber reinforcement in targeted fan blade areas); and reducing the weight and cost for each component (e.g., for each fan blade) by removing the metal cladding. Other advantages of the subject matter described herein also may be realized by those of ordinary skill in the art.

Further aspects of the invention are provided by the subject matter of the following clauses:

1. A composite airfoil of a gas turbine engine, comprising opposite pressure and suction sides extending radially along a span from a root to a tip, the root defining a first radial extremity of the airfoil and the tip defining a second radial extremity of the airfoil; opposite leading and trailing edges extending radially along the span, the pressure and suction sides extending axially between the leading and trailing edges; a plurality of continuous fiber layers, each continuous fiber layer comprising a plurality of continuous fibers; and a chopped fiber layer comprising a plurality of chopped fibers formed as a filmed sheet, wherein the chopped fiber layer is laid up with the plurality of continuous fiber layers to form the composite airfoil.

2. The composite airfoil of any preceding clause, wherein the plurality of chopped fibers are randomly oriented in the filmed sheet.

3. The composite airfoil of any preceding clause, wherein the plurality of continuous fibers of each continuous fiber layer are disposed in a first matrix material, and wherein the filmed sheet comprises the plurality of chopped fibers infused with a second matrix material.

4. The composite airfoil of any preceding clause, wherein the second matrix material is the same as the first matrix material.

5. The composite airfoil of any preceding clause, further comprising a plurality of chopped fiber layers, wherein the plurality of chopped fiber layers are laid up with the plurality of continuous fiber layers such that the plurality of chopped fiber layers are dispersed within the plurality of continuous fiber layers.

6. The composite airfoil of any preceding clause, further comprising a plurality of chopped fiber layers, wherein a fiber diameter varies among the chopped fibers of the plurality of chopped fiber layers to vary a fiber density among the plurality of chopped fiber layers.

7. The composite airfoil of any preceding clause, further comprising a plurality of chopped fiber layers, wherein a fiber length varies among the chopped fibers of the plurality of chopped fibers to vary a fiber density among the plurality of chopped fiber layers.

8. The composite airfoil of any preceding clause, further comprising a plurality of chopped fiber layers, wherein an areal weight varies among the chopped fibers of the plurality of chopped fibers to vary a fiber density among the plurality of chopped fiber layers.

9. The composite airfoil of any preceding clause, wherein the chopped fiber layer is disposed adjacent the tip to reinforce the tip of the airfoil.

10. The composite airfoil of any preceding clause, wherein the chopped fiber layer is disposed adjacent the trailing edge to reinforce the trailing edge of the airfoil.

11. The composite airfoil of any preceding clause, further comprising a plurality of chopped fiber layers, wherein the plurality of chopped fiber layers are biased toward an outer surface of the airfoil such that at least a majority of the plurality of chopped fiber layers are disposed among the plurality of continuous fiber layers proximate the outer surface.

12. The composite airfoil of any preceding clause, wherein the chopped fiber layer is disposed at an outer surface of the airfoil to define an exterior layer of the airfoil.

13. The composite airfoil of any preceding clause, wherein the chopped fiber layer is disposed at an inner surface of the airfoil to define a surface layer of the airfoil.

14. The composite airfoil of any preceding clause, wherein the chopped fibers are metallic fibers.

15. The composite airfoil of any preceding clause, wherein the metallic fibers are at least one of titanium, aluminum, and nickel fibers.

16. The composite airfoil of any preceding clause, wherein the chopped fibers are ceramic fibers or ceramic alloy fibers.

17. The composite airfoil of any preceding clause, wherein the ceramic or ceramic alloy fibers comprise silicon.

18. A method for forming a composite component of a gas turbine engine, the method comprising laying up a plurality of continuous fiber layers, each continuous fiber layer comprising continuous fibers disposed in a first matrix material; laying up a chopped fiber layer with the plurality of continuous fiber layers, the plurality of continuous fiber layers and the chopped fiber layer forming a reinforced layup; and curing the reinforced layup.

19. The method of any preceding clause, further comprising forming the chopped fiber layer, wherein the chopped fiber layer comprises a plurality of metallic chopped fibers infused with a second matrix material to form a filmed sheet.

20. The method of any preceding clause, wherein the first matrix material and the second matrix material are the same matrix materials.

21. The method of any preceding clause, wherein the first matrix material and the second matrix material are different matrix materials.

22. The method of any preceding clause, further comprising forming a plurality of chopped fiber layers.

23. The method of any preceding clause, wherein the plurality of chopped fiber layers are formed from one or more filmed sheets, each filmed sheet comprising a plurality of metallic chopped fibers infused with a matrix material.

24. The method of any preceding clause, further comprising cutting a filmed sheet to form two or more chopped fiber layers.

25. The method of any preceding clause, wherein curing the reinforced layup comprises debulking and curing the reinforced layup in an autoclave at an elevated temperature and an elevated pressure.

26. The method of any preceding clause, wherein the composite component is a composite airfoil reinforced with metallic chopped fibers.

27. A composite component of a gas turbine engine, comprising a plurality of continuous fiber layers, each continuous fiber layer formed from a plurality of continuous fibers disposed in a matrix material; and a chopped fiber layer comprising a plurality of chopped fibers formed as a filmed sheet, wherein the chopped fiber layer is laid up with the plurality of continuous fiber layers to form the composite component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A composite airfoil of a gas turbine engine, comprising:
   opposite pressure and suction sides extending radially along a span from a root to a tip, the root defining a first radial extremity of the composite airfoil and the tip defining a second radial extremity of the composite airfoil;
   opposite leading and trailing edges extending radially along the span, the pressure and suction sides extending axially between the leading and trailing edges;
   a plurality of continuous fiber layers, each continuous fiber layer comprising a plurality of continuous fibers; and
   a chopped fiber layer comprising a plurality of chopped fibers formed as a filmed sheet,
   wherein the chopped fiber layer is laid up with the plurality of continuous fiber layers to form the composite airfoil.

2. The composite airfoil of claim 1, wherein the plurality of chopped fibers are randomly oriented in the filmed sheet.

3. The composite airfoil of claim 2, wherein the plurality of continuous fibers of each of the plurality of continuous fiber layers are disposed in a first matrix material, and wherein the filmed sheet comprises the plurality of chopped fibers infused with a second matrix material.

4. The composite airfoil of claim 3, wherein the second matrix material is the same as the first matrix material.

5. The composite airfoil of claim 1, further comprising:
   a plurality of chopped fiber layers,
   wherein the chopped fiber layer is one of the plurality of chopped fiber layers, and
   wherein the plurality of chopped fiber layers are laid up with the plurality of continuous fiber layers such that the plurality of chopped fiber layers are dispersed within the plurality of continuous fiber layers.

6. The composite airfoil of claim 1, further comprising:
   a plurality of chopped fiber layers,
   wherein the chopped fiber layer is one of the plurality of chopped fiber layers, and
   wherein a fiber diameter varies among the chopped fibers of the plurality of chopped fiber layers to vary a fiber density among the plurality of chopped fiber layers.

7. The composite airfoil of claim 1, further comprising:
   a plurality of chopped fiber layers,
   wherein the chopped fiber layer is one of the plurality of chopped fiber layers, and
   wherein a fiber length varies among the chopped fibers of the plurality of chopped fiber layers to vary a fiber density among the plurality of chopped fiber layers.

8. The composite airfoil of claim 1, further comprising:
a plurality of chopped fiber layers,
wherein the chopped fiber layer is one of the plurality of chopped fiber layers, and
wherein an areal weight varies among the chopped fibers of the plurality of chopped fiber layers to vary a fiber density among the plurality of chopped fiber layers.

9. The composite airfoil of claim 1, wherein the chopped fiber layer is disposed adjacent the tip to reinforce the tip of the composite airfoil.

10. The composite airfoil of claim 1, wherein the chopped fiber layer is disposed adjacent the trailing edge to reinforce the trailing edge of the composite airfoil.

11. The composite airfoil of claim 1, further comprising:
a plurality of chopped fiber layers,
wherein the chopped fiber layer is one of the plurality of chopped fiber layers, and
wherein the plurality of chopped fiber layers are biased toward an outer surface of the composite airfoil such that at least a majority of the plurality of chopped fiber layers are disposed among the plurality of continuous fiber layers proximate the outer surface.

12. The composite airfoil of claim 1, wherein the plurality of chopped fibers are metallic fibers.

13. The composite airfoil of claim 12, wherein the metallic fibers are at least one of titanium, aluminum, and nickel fibers.

14. The composite airfoil of claim 1, wherein the plurality of chopped fibers are ceramic fibers or ceramic alloy fibers.

15. The composite airfoil of claim 14, wherein the ceramic fibers or ceramic alloy fibers comprise silicon.

16. A method for forming a composite airfoil of a gas turbine engine, the method comprising:
laying up a plurality of continuous fiber layers, each continuous fiber layer comprising a plurality of continuous fibers disposed in a first matrix material;
laying up a chopped fiber layer with the plurality of continuous fiber layers, the plurality of continuous fiber layers and the chopped fiber layer forming a reinforced layup; and
curing the reinforced layup to form the composite airfoil.

17. The method of claim 16, further comprising:
forming the chopped fiber layer,
wherein the chopped fiber layer comprises a plurality of metallic chopped fibers infused with a second matrix material to form a filmed sheet.

18. The method of claim 16, wherein curing the reinforced layup comprises debulking and curing the reinforced layup in an autoclave at an elevated temperature and an elevated pressure.

19. The method of claim 16, wherein the composite airfoil is a composite airfoil reinforced with metallic chopped fibers.

20. A composite airfoil of a gas turbine engine, comprising:
a plurality of continuous fiber layers, each continuous fiber layer formed from a plurality of continuous fibers disposed in a matrix material; and
a chopped fiber layer comprising a plurality of chopped fibers formed as a filmed sheet,
wherein the chopped fiber layer is laid up with the plurality of continuous fiber layers to form the composite airfoil.

* * * * *